United States Patent
Gordon et al.

(10) Patent No.: US 10,684,964 B1
(45) Date of Patent: Jun. 16, 2020

(54) SYSTEM AND METHOD FOR REDUCING READ LATENCY IN STORAGE DEVICES

(71) Applicant: LIGHTBITS LABS LTD., Kfar Saba (IL)

(72) Inventors: Abel Alkon Gordon, Haifa (IL); Sagi Grimberg, Kfar Saba (IL); Shmuel Ben-Yehuda, Haifa (IL)

(73) Assignee: Lightbits Labs Ltd., Kfar Saba (IL)

(*) Notice: Subject to any disclaimer, the term of this patent is extended or adjusted under 35 U.S.C. 154(b) by 37 days.

(21) Appl. No.: 16/051,500

(22) Filed: Aug. 1, 2018

(51) Int. Cl.
| | | |
|---|---|---|
| G06F 13/16 | (2006.01) | |
| G06F 13/18 | (2006.01) | |
| G06F 12/02 | (2006.01) | |
| G06F 3/06 | (2006.01) | |

(52) U.S. Cl.
CPC ........... *G06F 13/161* (2013.01); *G06F 3/065* (2013.01); *G06F 3/0611* (2013.01); *G06F 3/0634* (2013.01); *G06F 3/0679* (2013.01); *G06F 12/0253* (2013.01); *G06F 13/18* (2013.01); *G06F 2212/7201* (2013.01); *G06F 2212/7205* (2013.01)

(58) Field of Classification Search
CPC ...... G06F 3/0611; G06F 3/0634; G06F 3/065; G06F 3/0679; G06F 12/0253; G06F 13/161; G06F 13/18; G06F 2212/7201; G06F 2212/7205
See application file for complete search history.

(56) References Cited

U.S. PATENT DOCUMENTS

| | | | | |
|---|---|---|---|---|
| 6,035,376 A | * | 3/2000 | James | G06F 12/0817 711/103 |
| 6,584,550 B1 | * | 6/2003 | James | G06F 12/0824 711/145 |
| 10,090,067 B1 | * | 10/2018 | Canepa | G11C 29/789 |
| 2007/0214315 A1 | * | 9/2007 | Chandrasekaran | G06F 3/0611 711/114 |
| 2011/0185114 A1 | * | 7/2011 | Bolanowski | G06F 3/0679 711/103 |
| 2016/0006673 A1 | * | 1/2016 | Thomas | G06F 9/544 709/226 |
| 2018/0032266 A1 | * | 2/2018 | Yan | G06F 3/0653 |
| 2019/0212945 A1 | * | 7/2019 | Noh | G06F 3/0604 |

* cited by examiner

*Primary Examiner* — Nanci N Wong
(74) *Attorney, Agent, or Firm* — Pearl Cohen Zedek Latzer Baratz LLP (57) ABSTRACT

A system and a method for reducing read latency of a storage media associated with at least one host computer, by at least one processor, may include assigning each storage segment of the non-volatile storage to a first Read-Latency Set (RLS) and a second RLS, wherein the first RLS is attributed a read/write mode and the second RLS is attributed a read-only mode; receiving read-requests and write-requests from the at least one host computer, wherein each of said requests is attributed a priority; and serving the received requests according to RLS work modes and according to the priority of each request.

17 Claims, 8 Drawing Sheets

SYSTEM AND METHOD FOR REDUCING READ LATENCY IN STORAGE DEVICES

FIELD OF THE INVENTION

The present invention relates generally to computer storage systems. More specifically, the present invention relates to reducing latency in storage systems.

BACKGROUND OF THE INVENTION

Modern computer storage devices such as non-volatile flash memory devices and solid-state drives (SSDs) are very sensitive to the effect of data write access on latency of read access cycles. During write access cycles, read access requests to the same memory space may be blocked by a controlling module (e.g. a flash translation layer) and thus read operations performed by a requesting host may be delayed, thus increasing read access latency.

Read access latency may be distributed according to a probability distribution function P(L), where L is a value of latency, and P(L) is a probability that latency of a specific read access operation is below L. The term "tail latency" herein refers to an upper bound of latency experienced by a high percentile of read access operations. For example, P(L)=99% corresponds with a top 1 percent of read access operation latencies, meaning that 99% of read-access operations experience less than L latency.

Tail latency is a good representative of a worst-case read-access scenario and corresponds with a user's experience of the storage system. The effect of read access blocking is especially significant in relation to the memory device's Quality of Service (QOS) and tail latency.

Read access tail latency is tightly associated with foreground and background write operations that the memory device is handling. Applications associated with the storage device may be optimized to guarantee sequential write access to the storage. However, simultaneous read operations may be blocked due to background operations. While such a phenomenon may only slightly affect the average read latency, read tail latency will be increased significantly.

On the other hand, flash translation layers may take measures to reduce the randomness of data storage processes but cannot control the randomness of read operations which are driven from requesting applications, which may collide with write access operations.

Some storage devices support internal suspension of a program operation, to service read operations from the same page/block/die. However, the storage device cannot starve a program operation, so a consistent, low read tail latency cannot be guaranteed in the presence of program operations including write access operations.

Some commercially available storage devices include mechanisms for reducing read latency by duplication of stored data, but lack mechanisms for prioritizing and selecting data to be duplicated, and hence are inefficient in the consumption of storage space.

A method for minimizing read access latency, and especially read access tail latency and maintaining high QOS for read access of memory and storage devices, such as non-volatile memory devices, solid state drives (SSDs), hard disk drives (HDDs) and the like is therefore desirable.

SUMMARY OF THE INVENTION

Embodiments of the present invention include a system for reducing read latency in a storage media associated with at least one host computer. Embodiments may include: a plurality of storage segments comprised within at least one storage device and a processor. The processor may be configured to: (a) assign each storage segment to one of a first Read latency Set (RLS) and a second RLS, where the first RLS may be attributed a read/write mode, and the second RLS may be attributed a read-only mode; (b) receive read requests and write requests from the at least one host computer, where each of the requests may be attributed a priority; and (c) serve the received read requests and write requests according to RLS work modes and according to the priority of each request.

The processor may be configured to cyclically alternate the attribution of each RLSs' work mode such that for each RLS the mode may be switched between the read/write work mode and the read-only work mode.

The processor may be further configured to: (a) upon receiving a low priority data-write request of a data object from the at least one host computer, write the data into a storage segment referenced by an RLS that may be attributed a read/write work mode; and (b) upon receiving a low priority data-read request from the at least one host computer, read the data from the storage segment it was written to, regardless of the RLS's attributed work mode.

The processor may be further configured upon receiving a high priority data-write request of a data object from the at least one host computer to: (a) write the high priority data into a first storage segment referenced by a first RLS that may be attributed a read/write work mode; (b) switch the work mode of the first RLS to the read-only mode; (c) switch the work mode of a second RLS from the read-only mode to the read/write mode; and (d) write the high priority data into a second storage segment referenced by the second RLS, thus duplicating the storage of high priority data on a plurality of RLSs.

The processor may be further configured, upon receiving a high priority data-read request from the at least one host computer, to read the data from a storage segment referenced by an RLS that may be attributed a read-only work mode.

In some embodiments, the system may include a Random-Access Memory (RAM) device, and the processor may be configured, upon receiving a high priority data-write request from the at least one host computer, to write the data into the RAM device substantially simultaneously to writing the data into the storage segment referenced by the first RLS that may be attributed a read/write operation mode.

The processor may be further configured, after the work modes of the first and second RLSs are switched, to copy the high priority data from the RAM into the storage segment referenced by the second RLS.

The processor may be further configured so that: (a) if the high priority data-write request is followed by a high priority data-read request for the same storage segment, before the RLS's work mode has been alternated, the processor may serve the high priority data-read request by reading the data from the RAM; and (b) if a high priority data-write request is followed by a high priority data-read request of the same storage segment, before the RLS's work mode has been switched, the processor may serve the high priority data-read request by reading the data from the RAM.

According to some embodiments, the system may further include a metadata table, configured to associate a virtual address of at least one stored data object to a plurality of physical addresses, where the data object may be duplicated across different RLSs.

According to some embodiments, the processor may be configured to manage an overwrite of a high-priority, duplicated data object by: (a) rewriting the data object in a duplicated plurality of locations on different RLSs; (b) invalidating the previous duplicated instantiations of the data object; and (c) updating the metadata table according to the changed physical storage addresses of the high-priority data object.

The processor may be further configured to perform garbage collection (GC) on at least one duplicated data object by: (a) copying an old instantiation of a first duplication of a data object from a first valid storage segment to a second storage segment, wherein the second storage segment may be in an RLS different from the second duplication of the data object; (b) invalidating the old instance of the first duplication of the data object; and (c) updating the metadata table to reflect the corresponding change in the physical address of the first duplication of the data object.

The processor may be further configured to receive at least one parameter, associated with a characteristic of at least one storage device and select a specific target storage device for each data object, to balance a load between different storage devices according to each storage device's characteristics.

Embodiments of the present invention may include a method for reducing read latency of a storage media associated with at least one host computer, by at least one processor. The method may include: (a) assigning each storage segment of the non-volatile storage to a first Read-Latency Set (RLS) and a second RLS, where the first RLS may be attributed a read/write mode and the second RLS may be attributed a read-only mode; (b) receiving read-requests and write-requests from the at least one host computer, where each of the requests may be attributed a priority; and (c) serving the received requests according to RLS work modes and according to the priority of each request.

Embodiments of the method may further include cyclically alternating the attribution of the RLSs' work modes, to switch the modes between the read/write work mode and the read-only work mode.

Embodiments of the method may further include: (a) upon receiving a low priority data-write request from the at least one host computer, writing the data into a storage segment referenced by an RLS that is attributed a read/write work mode; and (b) upon receiving a low priority data-read request from the at least one host computer, reading the data from the storage segment it was written to, regardless of the RLS's attributed work mode.

According to some embodiments, a method may include, upon receiving a high priority data-write request from the at least one host computer: (a) writing the high priority data into a first storage segment referenced by a first RLS that may be attributed a read/write work mode; (b) switching the work mode of the first RLS from the read/write work mode to the read-only mode; (c) switching the work mode of a second RLS from the read-only mode to the read/write work mode; and (d) writing the high priority data into a second storage segment referenced by the second RLS.

According to some embodiments, the method may include: upon receiving a high priority data-read request from the at least one host computer, reading the data from a storage segment referenced by an RLS that is attributed a read-only work mode.

According to some embodiments, a method may include: upon receiving a high priority data-write request from the at least one host computer, writing the data into a RAM device substantially simultaneously to writing the data into the storage segment referenced by the first RLS that is attributed a read/write operation mode.

According to some embodiments, a method may include: after the work modes of the first and second RLSs are switched, copying the high priority data from the RAM into the storage segment referenced by the second RLS.

If the high priority data-write request is followed by a high priority data-read request for the same storage segment, before the RLS's work mode has been alternated, then embodiments may include serving the high priority data-read request by reading the data from the RAM.

Embodiments of the present invention may include a method for managing high priority data access requests of at least one host computer from a storage device by at least one processor. Embodiments of the method may include: (a) Receiving a high priority write access request from the at least one host computer; (b) writing data of the high priority write access to a first segment of the storage device, wherein the first segment may be attributed a read/write working mode; (c) switching the work mode of the first segment from read/write working mode to a read-only working mode; (d) switching a work mode of a second storage segment of the storage device from a read-only work mode to a read/write work mode; and (e) writing data of the high priority write access to the second segment of the storage device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The terms "memory device" and "storage device" are used herein interchangeably, to refer to a single device, such as a non-volatile memory (NVM) device, a flash storage device, a solid-state storage device (SSD), a hard-disk drive (HDD) or the like, that may, or may not be managed by a storage controller as described herein.

The term "storage media" is used herein to refer to one or more memory devices and/or storage devices, that may be managed by a storage controller, as described herein.

Embodiments of the present invention may reduce read access tail latency in a storage device, such as a non-volatile memory (NVM) device. Embodiments may include:

assigning each segment of the storage device to one of at least two Read Latency Sets (RLSs) or other divisions or partitions, where at least one RLS may be attributed, by a storage manager, a read/write mode and the other RLSs may be attributed by the storage manager a read-only mode;

receiving read requests and write requests from at least one host computer, where each of the requests may be attributed (e.g. by a specific application, process or volume, as explained herein) a priority, urgency, ranking, or other similar type of attribute; and serving the received read requests and write requests, by the storage manager, according to the work modes of the RLSs and according to each request's priority, as explained herein.

According to some embodiments, the storage address space may be divided to include exactly two RLSs, where each RLS may be assigned a different work mode, and the work modes may be toggled between the RLSs periodically, or according to a triggering event, as depicted in Table 1:

TABLE 1

|  | Time: T1 | Time: T2 > T1 | Time: T3 > T2 | Time: T4 > T3 |
| --- | --- | --- | --- | --- |
| RLS #1 | Work mode 1 | Work mode 2 | Work mode 1 | Work mode 2 |
| RLS #2 | Work mode 2 | Work mode 1 | Work mode 2 | Work mode 1 |

In alternate embodiments, other relationships between triggering events and work modes may be implemented. For example, the storage address space may be divided into more than two RLSs, to support a condition in which more than two priorities are defined. In such embodiments, at each given moment at least one RLS may be assigned a first work mode (e.g. a read/write mode), the others RLSs may be assigned a second work mode (e.g. a read-only mode), and the work modes may be switched or toggled on each RLS at a different time, for example as depicted in Table 2:

TABLE 2

|  | Time: T1 | Time: T2 > T1 | Time: T3 > T2 | Time: T4 > T3 |
| --- | --- | --- | --- | --- |
| RLS #1 | Work mode 1 | Work mode 2 | Work mode 2 | Work mode 1 |
| RLS #2 | Work mode 2 | Work mode 1 | Work mode 2 | Work mode 2 |
| RLS #3 | Work mode 2 | Work mode 2 | Work mode 1 | Work mode 2 |

In alternate embodiments, more than two work modes may be used, and the work modes may be switched on each RLS at a different time, for example as depicted in Table 2:

TABLE 3

|  | Time: T1 | Time: T2 > T1 | Time: T3 > T2 | Time: T4 > T3 |
| --- | --- | --- | --- | --- |
| RLS #1 | Work mode 1 | Work mode 3 | Work mode 2 | Work mode 1 |
| RLS #2 | Work mode 2 | Work mode 1 | Work mode 3 | Work mode 2 |
| RLS #3 | Work mode 3 | Work mode 2 | Work mode 1 | Work mode 3 |

According to some embodiments, the work mode of at least one RLS may be switched or toggled according to at least one event, including for example: elapse of a predefined period, occurrence of a predefined number of storage write access requests, occurrence of a predefined number of storage read access requests, a predefined amount of data that has been written to the storage media, or any other predefined event that may have involved storage media 20 and/or storage manager 30.

Figure 1:
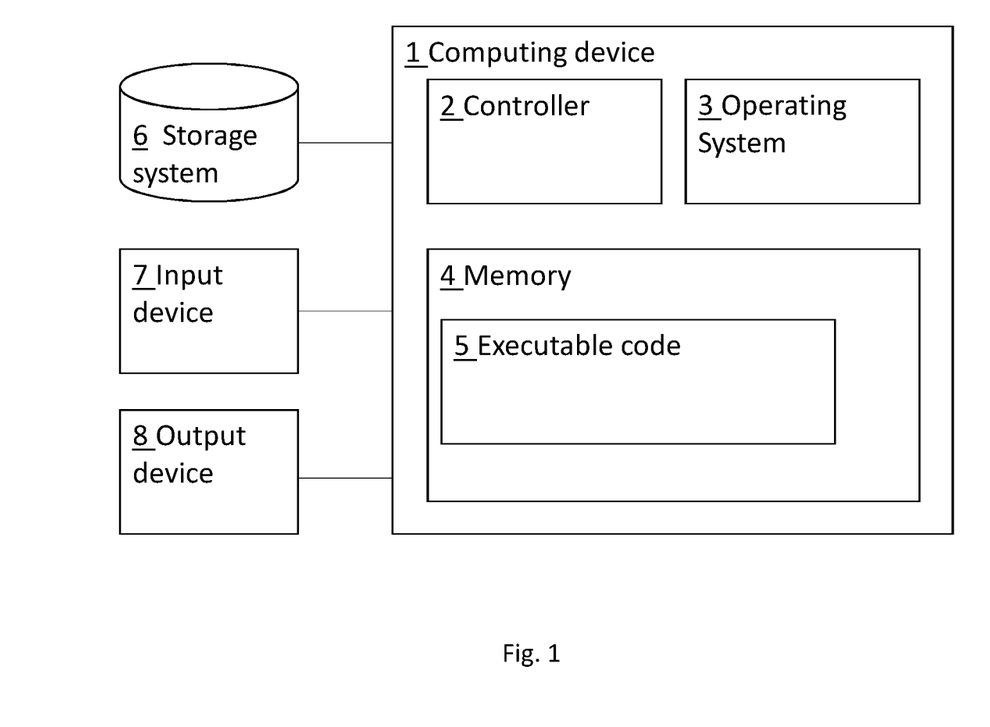
FIG. 1 is a block diagram depicting a computing device, which may be included within a system for reducing read latency in storage and memory devices such as non-volatile memory (NVM) devices, according to some embodiments.

Reference is now made to FIG. 1, which is a block diagram depicting a computing device, which may be included within a system for reducing read latency, and especially read tail latency in storage devices (e.g., NVM storage devices), according to some embodiments.

Computing device 1 may include a controller 2 that may be, for example, a central processing unit processor (CPU), a chip (e.g., a Field Programmable Gate Array (FPGA), an Application Specific Integrated Circuit (ASIC), and the like) or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that enforces security in a vehicle as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory1 20 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
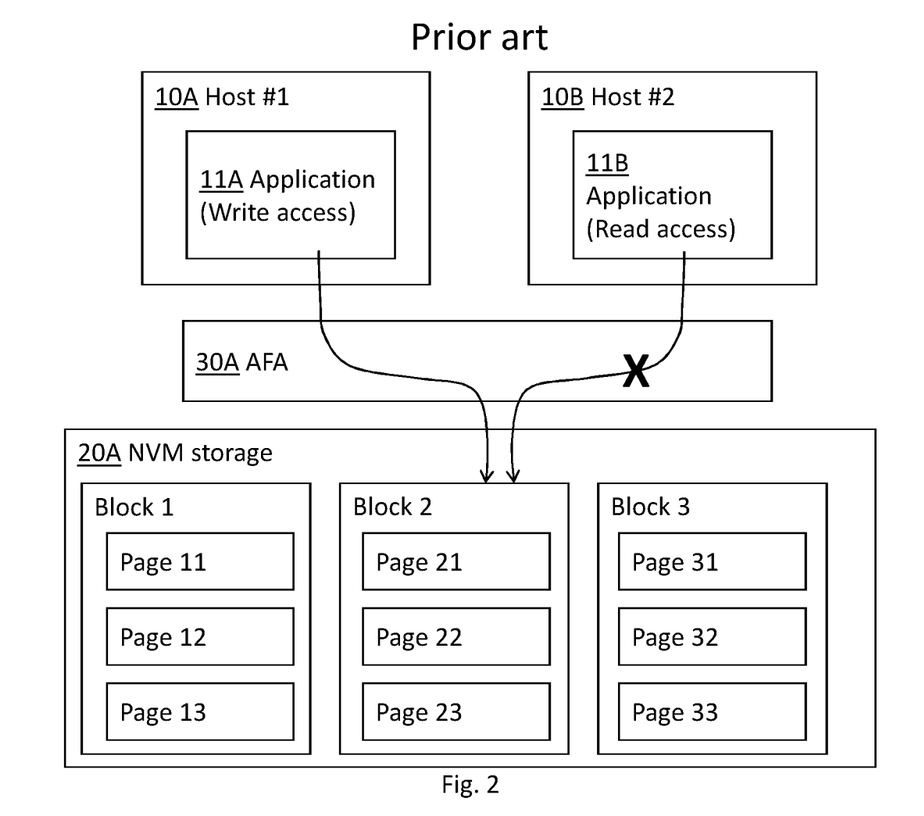
FIG. 2 is a block diagram, depicting a common read-block condition in commercially available NVM devices.

Reference is made to FIG. 2, which is a block diagram, depicting an example to a read-block condition in modern NVM devices, in the absence of a system for reducing read latency in storage devices.

In this example, a first host computer 10A and a second host computer 10B may both implemented as computing devices (e.g. element 1 of FIG. 1) and may execute applications 11A and 11B respectively. Host computer 10A and 10B may both be associated with a non-volatile storage device (e.g. a flash device) 20A, through a control module, such as an All Flash Array (AFA) 30A.

AFA 30A may be communicatively connected to host computers 10A and 10B and may be associated with at least one NVM storage device 20A. For example, AFA 30A may be connected to host computers 10A and 10B via a computer network (e.g. the Internet) and attached to NVM storage device 20A through, for example, a Peripheral Component Interconnect Express (PCIE) bus.

AFA 30A may receive storage access (e.g. read access, write access) requests from host computers 10A and 10B. The storage access requests may be associated with an application virtual address space 11 (e.g. 11A, 11B). AFA 30A may translate the virtual application addresses 11 to physical addresses associated with a physical storage location on NVM storage device 20A, as known to persons skilled in the art.

In the scenario depicted in FIG. 2, application 11a may perform a write access to block 2 of NVM device 20A, and application 11B may simultaneously or concurrently (e.g. approximately at the same time or overlapping in time) perform a read access to the same block. AFA 30A may block the read access operation of application 11B, at least until the write access operation of application 11A is finished and may thus increase the tail latency of read access operations.

Figure 3:
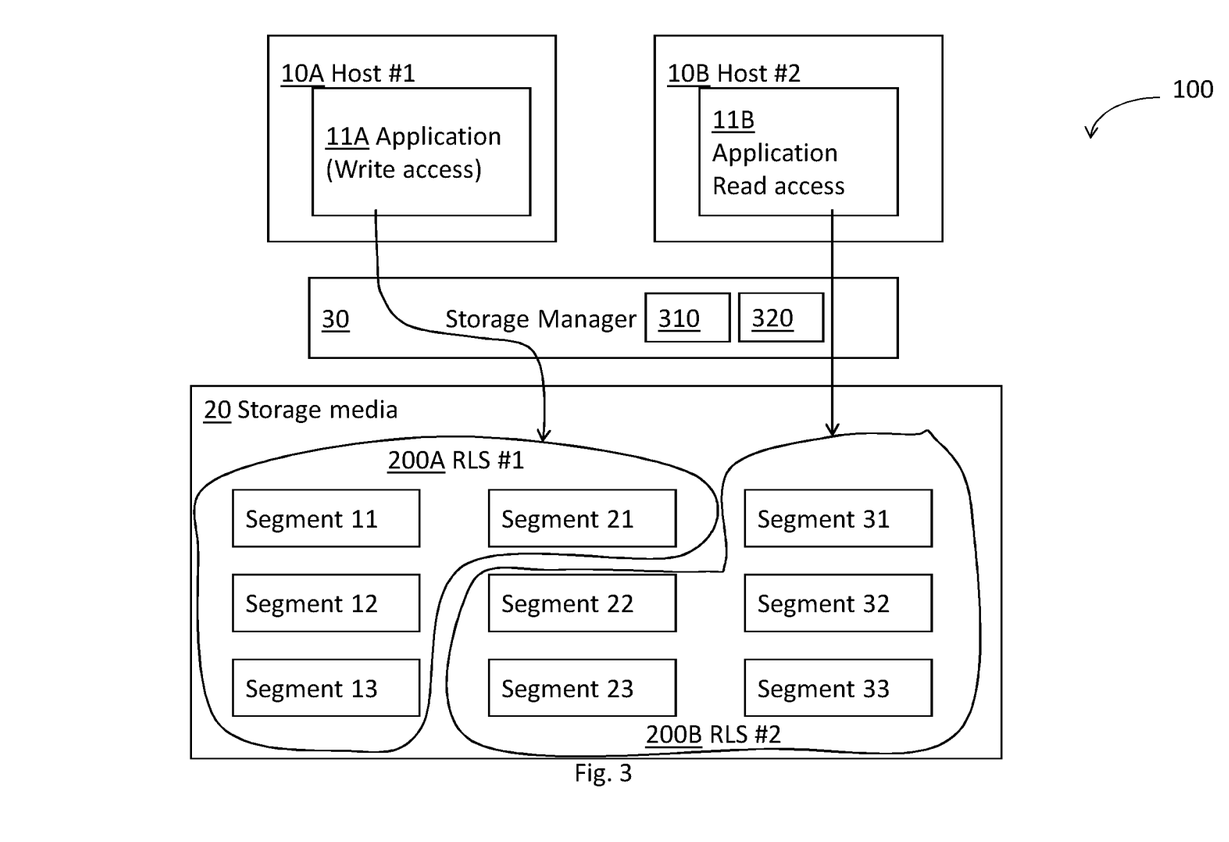
FIG. 3 is a block diagram, depicting a solution to the read-block condition, according to some embodiments.

Reference is made to FIG. 3, which is a block diagram, depicting an embodiment of a system 100 for reducing read-access latency of a computing device (e.g. a host computer 10) from at least one storage device (e.g. NVM storage devices), to solve the read-block condition presented in FIG. 2, according to some embodiments.

Embodiments of system 100 may generally decrease read latency on NVM storage media. In one example, the improvement is evident in the average read latency and is especially noticeable in the read tail latency.

At least one host computer 10 (e.g. 10A, 10B) may be associated with storage media (e.g. at least one non-volatile storage device) 20, to store and access data thereon through a control module, such as storage manager 30. For example, storage media 20 may include stored data (e.g. a database), and host computer 10 may be remotely connected (e.g., via a Wide Area Network (WAN)) or locally connected (e.g., via a Peripheral Component Interconnect Express (PCIE) bus) to storage media 20, to store and retrieve data therefrom.

Storage media 20 may include one or more storage devices (e.g., a flash die, a solid-state drive, etc.), and may be divided to a plurality of memory segments or sections (e.g., elements 11, 12, 13, 21, 22, 23, 31, 32, 33). The term 'segment' is used herein for brevity, to refer to memory segments included within the at last one storage device of storage media 20.

According to some embodiments, storage manager 30 may be implemented as a computing device (e.g. element 1 of FIG. 1) and may include a non-transitory computer readable memory device (e.g. element 4 of FIG. 1), on which computer-executable instruction code may be stored and a processor or controller (e.g. element 2 of FIG. 1), associated with memory device 4, and configured to execute the computer-executable instruction code, to implement embodiments of the method for solving read-block conditions on storage device 20.

In some embodiments, storage media 20 may include one or more non-volatile memory device (e.g. a flash memory device), and storage manager 30 may include a non-volatile memory manager or controller, as known to persons skilled in the art.

Storage manager 30 may receive storage access (e.g. read access, write access) requests from at least one host computer 10 (e.g. 10A, 10B). At least one access requests may be associated with at least one an application, process, thread and the like, associated with a virtual application address space 11.

In some embodiments, at least one virtual application addresses space may be divided to a plurality of volumes, and each volume may be associated with a priority (e.g. high priority, low priority), so that each storage access request may be associated with a respective priority.

Storage manager 30 may translate the virtual application addresses 11 to physical addresses associated with a physical storage location on storage device 20, as known to persons skilled in the art, and may relate to each storage access request according to its respective priority, as explained herein.

Storage manager 30 may divide the memory segments or sections of storage media 20 to at least two groups, both referred to as Read Latency Sets (RLS) and referred to by a data structure also called an RLS. As shown schematically in FIG. 3, storage manager 30 may be configured to associate each memory segment to one of the at least two Read-Latency Sets (RLSs) 200A, 200B: segments 11, 12, 13 and 21 are associated with RLS 200A, whereas segments 22, 23, 31, 32 and 33 are associated with RLS 200B.

In some embodiments, storage media 20 may include one or more NVM devices, and storage manager 30 may be an NVME (Non-Volatile Memory Express) controller. NVME controller 30 may handle storage access requests (e.g., read requests and write requests) on each NVM storage device of storage media 20 according to NVM different streams, in a way that each stream is isolated from each other, as known to persons skilled in the art. Storage manager 30 may associate each stream to one of the two or more RLS s (e.g. 200A and 200B), so that each RLS may be represent a set of streams, including one or more streams in one or more NVM devices.

According to some embodiments, storage manager 30 may enable a user to determine (e.g. via an input device, such as element 7 of FIG. 1) a percentage of the virtual storage memory space that needs to be reserved for high priority data storage. Storage manager 30 may divide the memory segments or sections of storage media 20 according to at least one of: (a) the determined percentage and (b) the total capacity of storage media 20.

For example: a user may require 20 percent of the virtual storage space (including all volumes) to be reserved for high priority data storage. Storage manager 30 may consequently divide the physical memory space to a first RLS (e.g. RLS 1) spanning 20 percent of storage media's 20 address space, and a second RLS (e.g. RLS 2) spanning 80 percent of storage media's 20 address space.

Storage manager 30 may attribute a work mode to each RLS. The attributed work mode may for example be a read-only mode and a read/write mode. In some embodiments, Storage manager 30 may attribute a read/write mode to at least one RLS and attribute all other RLSs a read-only mode. In some embodiments, storage manager 30 may assign an initial work mode to each RLS, according to a predefined default value. For example: RLS 1 may be assigned a read-only mode and RLS 2 may be assigned a read/write mode.

According to some embodiments, the division of memory segments to different RLSs, and attribution of work modes thereto by storage manager 30 may be performed, for example, by maintaining a work mode table 310, associating or assigning each memory segment (e.g. elements 11, 21, 31, etc.) to one of the RLSs (e.g. 200A, 200B) and to one work mode (e.g. read-only, read/write).

In one embodiment an RLS may define a division of the address space, for example:
RLS1: address 0x0000 to 0x1FFF
RLS2: address 0x2000 to 0xFFFF This division may be stored, for example in work mode table 310, which may reference RLSs, the divisions or partitions assigned to RLSs, and other information.

Thus, RLSs and associated data (e.g., work mode) may be stored for example in work mode table 310. Work mode table 310 may, for example, be stored as a data table on a memory device (e.g. element 4 of FIG. 1), associated with, or included within storage manager 30.

Storage manager 30 may be configured to cyclically and/or periodically alternate or toggle the attribution of work modes of RLSs, to switch between different work modes. Switching of RLSs work modes may also switch work modes of memory or storage segments referenced by or described within respective RLSs. For example, storage manager 30 may attribute a first work mode (e.g. read-only) to a first RLS (e.g. 200A and respective referenced segments 11, 12, 13 and 21) and attribute a second work mode (e.g. read/write) to a second RLS (e.g. 200B and respective referenced segments 22, 23, 31, 32 and 33) and then inverse this attribution, to switch the RLS work modes (e.g. attribute read/write work mode to 200A and read-only to 200B, and vice versa). In some embodiments, the inversion or toggling of work mode attribution may be performed periodically (e.g. when a predefined period has elapsed).

In alternate embodiments, the inversion or toggling of work mode attribution may be performed according to a triggering event. For example, storage manager 30 may invert or toggle a work mode after a predefined amount of data has been written to an RLS of storage media 20, or has been written to a buffer memory device, as explained below, in relation to FIGS. 5A and 5B.

Storage manager 30 may receive read access requests and write access requests from at least one host computer 10 (e.g. 10A, 10B), where each of the read access and write access requests may be attributed a priority, urgency or ranking, for example including at least one of a high priority and a low priority.

According to some embodiments, host computer 10 may execute a plurality of processes or applications, where at least one first process or application requires real-time, or near real time responsiveness or quality of service (QoS), and at least one second application or process does not require such responsiveness or QoS. The at least one first application may store and access data objects on a virtual storage volume that is attributed a 'high' priority, and the at least one second application may store and access data objects on a virtual storage volume that is attributed a 'normal' or 'low' priority. Storage manager 30 may assign a priority to each storage access (e.g. read access and write access) request, according to the priority of the respective virtual storage volume priority.

According to alternate embodiments, the priority may be attributed to the read access and write access requests by the at least one host computer 10 (e.g. 10A, 10B). According to alternate embodiments, storage manager 30 may be configured to assign priorities to read access and write access requests according to a predefined list of criteria, including for example: identity of an application (e.g. 11a, 11b), identity of a process and/or thread including the application, user-name of an owner of the application, parameters relating to load-balancing among host computers 10A, 10B, etc. For example, storage manager 30 may assign a high priority to a write access request from a first process, and a low priority to a write access request from a second process.

Storage manager 30 may be configured to handle the received read requests (e.g. provide the data requested by host computers 10A, 10B) and write requests (e.g. send the data to be stored on storage media 20) according to RLS work modes and each request's priority, as explained herein.

Figure 4:
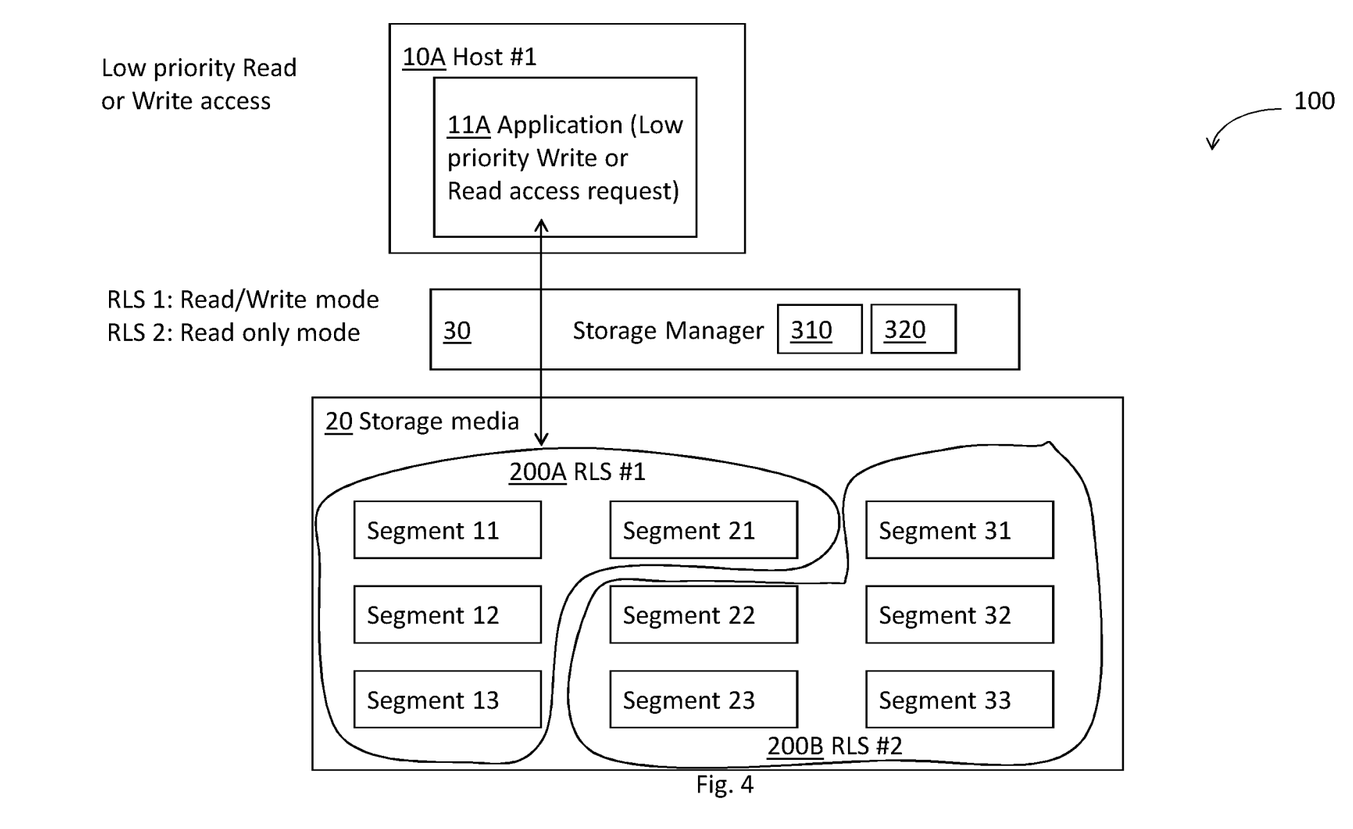
FIG. 4 is a block diagram, depicting a low priority read access or write access of a host computer to a storage device, according to some embodiments.

Reference is made to FIG. 4, which is a block diagram, depicting an example of a low priority read access or a low priority write access of host computer 10A to storage media 20, according to some embodiments.

Storage manager 30 may be configured to handle low priority access requests from at least one host computer 10A. For example, a process may include: (a) upon receiving a low priority data-write request, writing the data into a memory or storage segment (e.g. segment 11) referenced by or described within an RLS (e.g. 200A) that may be attributed a read/write work mode; and (b) upon receiving a low priority data-read request, reading the data from the memory segment (e.g. segment 11) it was written to, regardless of or without consideration of the RLS's attributed work mode. This scheme may allow low priority read access requests to be blocked in relation to write access operations.

Figure 5A:
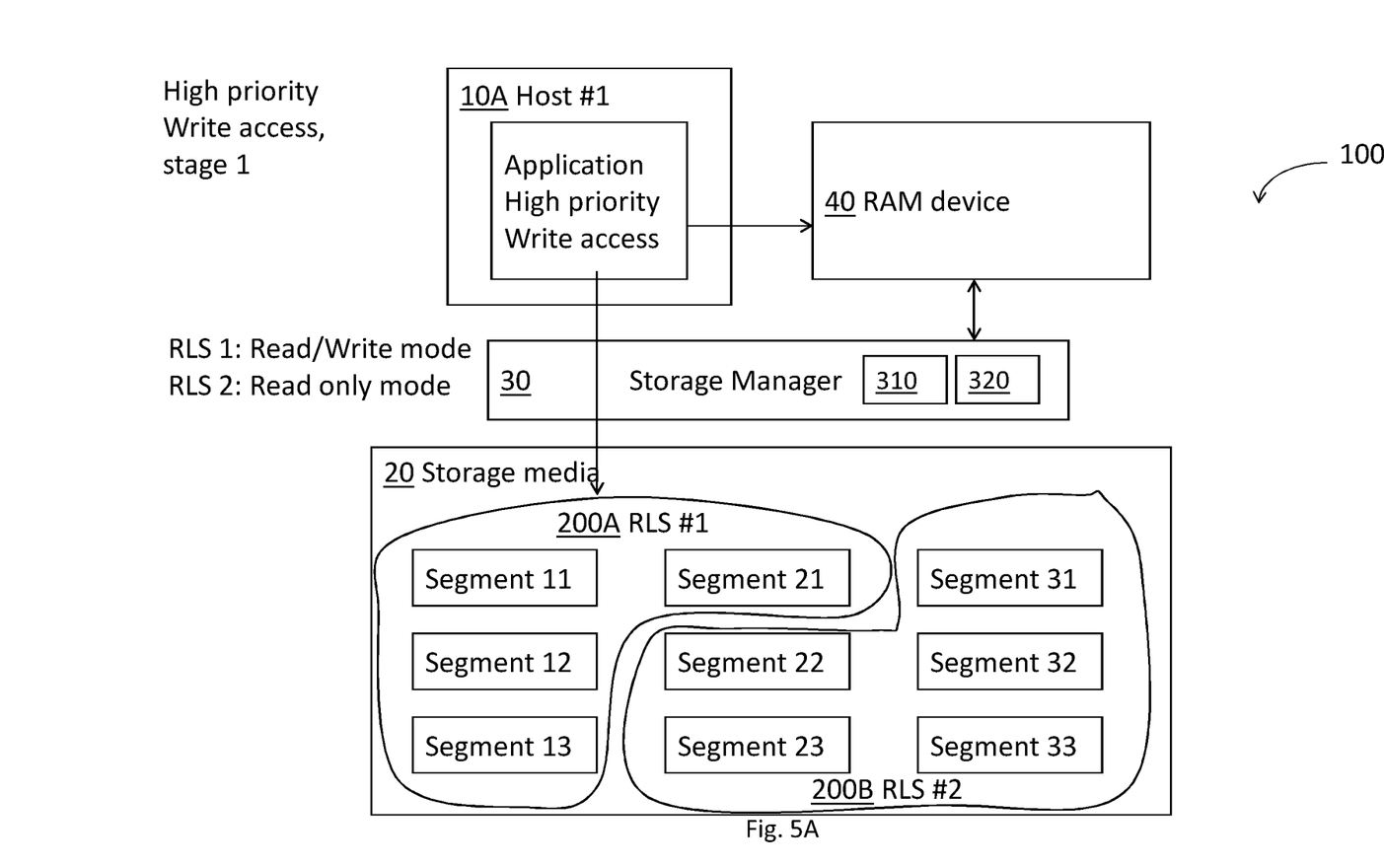
FIG. 5A and FIG. 5B jointly present a block diagram, respectively depicting a first stage and a second stage of a high priority write access of a host computer to a storage device, according to some embodiments.
Figure 5B:
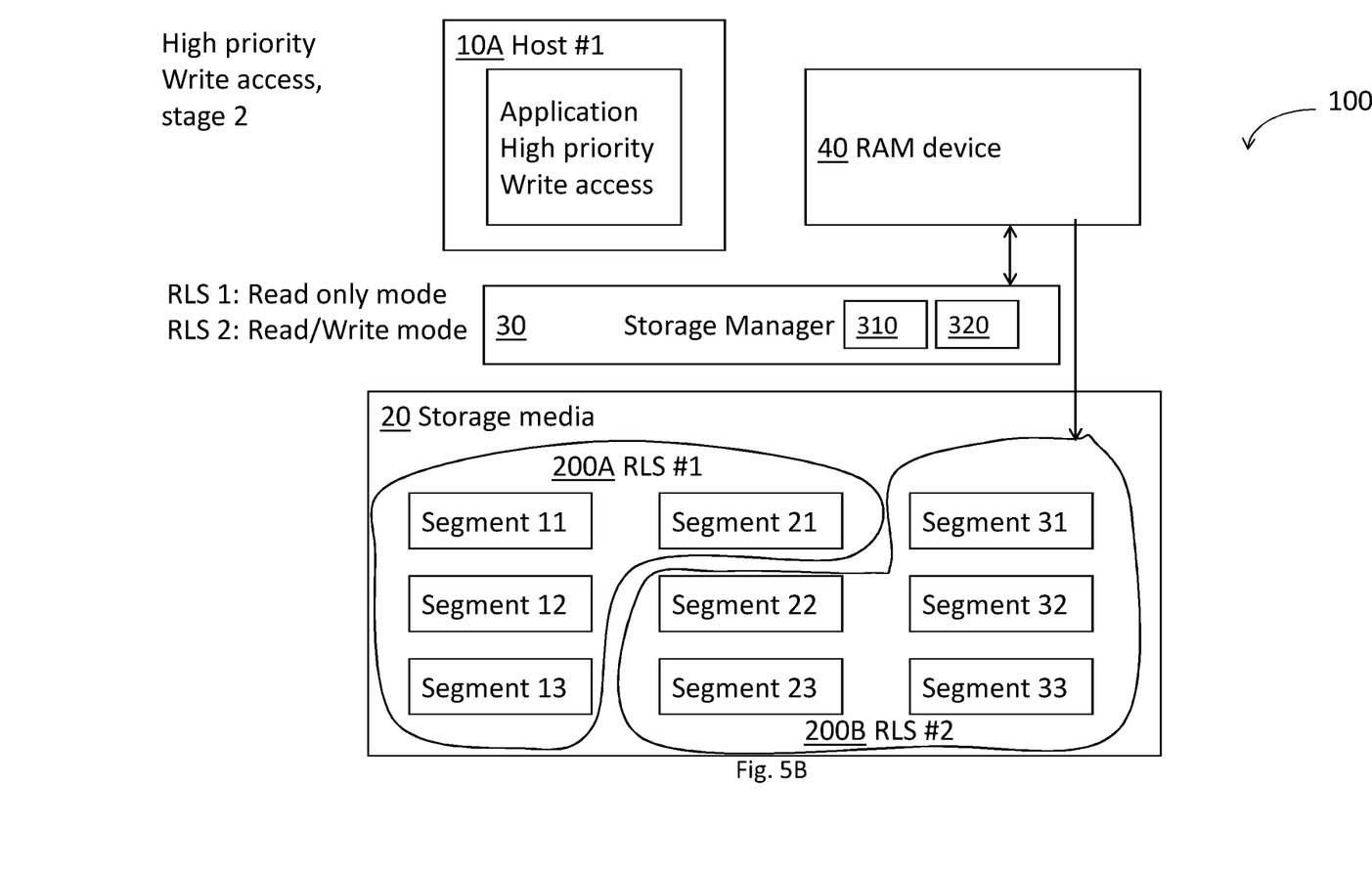

Reference is made to the block diagrams of FIG. 5A and FIG. 5B, which respectively depict a first stage and a second stage of a high priority write access of a host computer to a storage device, according to some embodiments.

According to some embodiments, upon receiving a high priority data-write request from at least one host computer 10A, storage manager 30 may handle the high priority data-write request. For example, a process may include: (a) writing the high priority data into a memory segment (e.g. segment 11) referenced by or described within a first RLS 200A that may be attributed a read/write work mode; (b) switching or toggling the work mode of the first RLS 200A from the read/write work mode to the read-only work mode; (c) switching or toggling the work mode of a second RLS 200B from the read-only work mode to the read/write work mode; and (d) writing the high priority data again, into another memory segment (e.g. segment 31) referenced by or described within the second RLS 200B.

This scheme may create a duplication of high priority data on two, separate RLSs. Each of the two RLSs may be attributed a different work mode, thus permitting reading of high priority data at any time, in conjunction with writing of data to storage media 20, without blocking the read access operation, and without duplicating low priority data on storage media 20.

Storage controller 30 may include a metadata table 320, associating or translating the virtual address of at least one stored data object with its respective physical address, associated with its physical location, as known to persons skilled in the art.

According to some embodiments, metadata table 320 may include a plurality of entries for at least one data object, herein referred to as a duplication entry, to associate the virtual address of the stored data object to a plurality of physical addresses, where the data object is duplicated across different RLSs.

In some embodiments, storage manager 30 may use at least one duplication entry of metadata table 320, to accommodate normal storage manager operations per the duplicated data, as performed by common, commercially available storage managers (e.g. NVM managers) per single instantiations of data storage.

For example, a process or application 11 may store a data object on a virtual storage volume that is attributed a high priority. Storage manager 30 may duplicate the storage of the high priority data object and monitor the location of the duplicated storage by a duplication entry in metadata table 320, as discussed above. Application or process 11 may then overwrite the high priority data object. As known to persons skilled in the art, overwriting of data objects on NVM devices may require storing the new value in a new physical address, and invalidating the old storage entry. Storage manager 30 may be configured to manage an overwrite of a high-priority, duplicated data object by: (a) rewriting the data object in a duplicated plurality of locations on different RLSs of storage media (e.g. NVM storage media) 20; (b) invalidating the previous duplicated instantiations of the data object; and (c) updating metadata table 320 according to the changed physical storage addresses of the high-priority data object.

As known to persons skilled in the art, management of NVM storage media may require performing a garbage collection (GC) process, including aggregation of data stored on valid physical storage segment (e.g. a segment or a data block such as segment 11) to a new NVM storage segment (e.g. segment 21), and clearing invalidated NVM storage segments for reuse. In some embodiments, storage manager 30 may use at least one duplication entry of metadata table 320 to perform GC on a duplicated, high priority data object by:

(a) copying an old instantiation of a first duplication of a data object from a first valid storage segment (e.g. segment 11) to a second storage segment (e.g. segment 21), the second storage segment (e.g. segment 21) being in an RLS (e.g. RLS 1, 200A) that is different from the second duplication of the data object (e.g. segment 31, on RLS2, 200B);

(b) invalidating the old instance of the first duplication of the data object (e.g. on segment 11); and (c) updating metadata table 320 to reflect the corresponding change in the physical address of the first duplication of the data object (e.g., from segment 11 to segment 21).

Embodiments may include receiving a high priority write-access request from the at least one host computer. Storage manager 30 may write data included in the high priority write access to a first segment (e.g. segment 11) of storage media 20, that is attributed a read/write working mode.

As elaborated above, storage manager 30 may be configured to cyclically and/or periodically alternate or toggle attribution of work modes of memory segments of the storage media 20 between the read/write work mode and the read-only work mode. After switching the work modes of the first segment (e.g. segment 11) from read/write working mode to a read-only working mode and switching the work mode of a second memory segment (e.g. segment 31) of storage media 20 from a read-only work mode to a read/write work mode, storage manager 30 may write data of the high priority write access again, to the second segment (e.g. segment 31) of storage media 20.

Embodiments may include a Random-Access Memory (RAM) device 40 (e.g. a double data rate (DDR) device, a non-volatile RAM (NVRAM) device and the like), associated with storage manager 30. For example, RAM 40 may be connected (e.g. via DDR or PCIE interface) to storage manager 30 the same computerized device of storage manager 30.

Storage manager 30 may be configured to employ RAM 40 to handle high priority data-write requests from host computer 10A, according a process including for example: (a) writing the high priority data into a memory segment (e.g. segment 11) referenced by or described within a first RLS 200A that may be attributed a read/write work mode; (b) writing the high priority data into the RAM device 40 substantially simultaneously to or concurrently with (e.g. approximately at the same time, or overlapping in time) writing the data into the memory segment of the first RLS 200A; (c) switching the work mode of the first RLS 200A to the read-only mode; (d) switching the work mode of a second RLS 200B from the read-only mode to the read/write mode; and (e) writing the high priority data into another memory segment (e.g. segment 31) referenced by or described within second RLS 200B, directly from RAM device 40.

This scheme presents additional benefits to those of the previous scheme, as elaborated above. For example: embodiments may include direct writing of high priority data from the RAM to the second RLS 200B (as opposed to writing the data by storage manager 30). This may conserve resources of storage manager 30, including memory space and processor computing cycles. For example, system 100 may include a direct memory access (DMA) module (not shown), configured to transfer data between storage media 20 and RAM device 40, as known to persons skilled in the art.

In another example, if storage manager 30 receives a read access request from host computer 10A right after writing the high priority data to RAM device 40, but before the data has been written to a segment (e.g. segment 31) of the second RLS 200B, then storage manager 30 may serve or service the read access request from RAM device 40. In other words, if a high priority data-write request to a first segment (e.g. segment 11) is followed by a high priority data-read request of the same memory segment as for the data-write request (e.g., segment 11), before the RLS's work mode has been switched, then storage manager 30 may handle or serve the high priority data-read request by reading the data from RAM device 40. Storage manager 30 may not need to delay the serving of the read access request until either the work mode of the first RLS is alternated to the read-only mode or until the high priority data request is completed on a segment (e.g. segment 31) of the second RLS 200B.

In some embodiments, RAM device 40 may be implemented as an NVRAM device, as mentioned above. This implementation may be beneficial to avoid loss of data. For example, after a condition of power shortage occurs, storage manager 30 may identify at least one data object that is written to NVRAM device 40, and not present in storage media 20 or on metadata table 320. Storage manager 30 may consequently copy the data from NVRAM device to NV storage media, to resume normal operation.

According to some embodiments, storage manager 30 may invert or toggle a work mode of at least one RLS according to the content of RAM device 40. For example, storage manager 30 may toggle the work mode after a predefined amount of data is written to RAM device 40.

According to some embodiments, storage manager 30 may be configured to receive a read access request from a host device 10 to a stored data object and return the read data according to a predefined hierarchy.

For example, storage manager 30 may be configured to first search for a requested data object on RAM device 40. If the data is found in device 40, NVRAM may respond to the read request by returning the read value from RAM device 40. If the data is not found in device 40, it may be read, and returned to the host from the corresponding RLS, based on the data object's priority, and RLS work modes, as explained herein.

Figure 6:
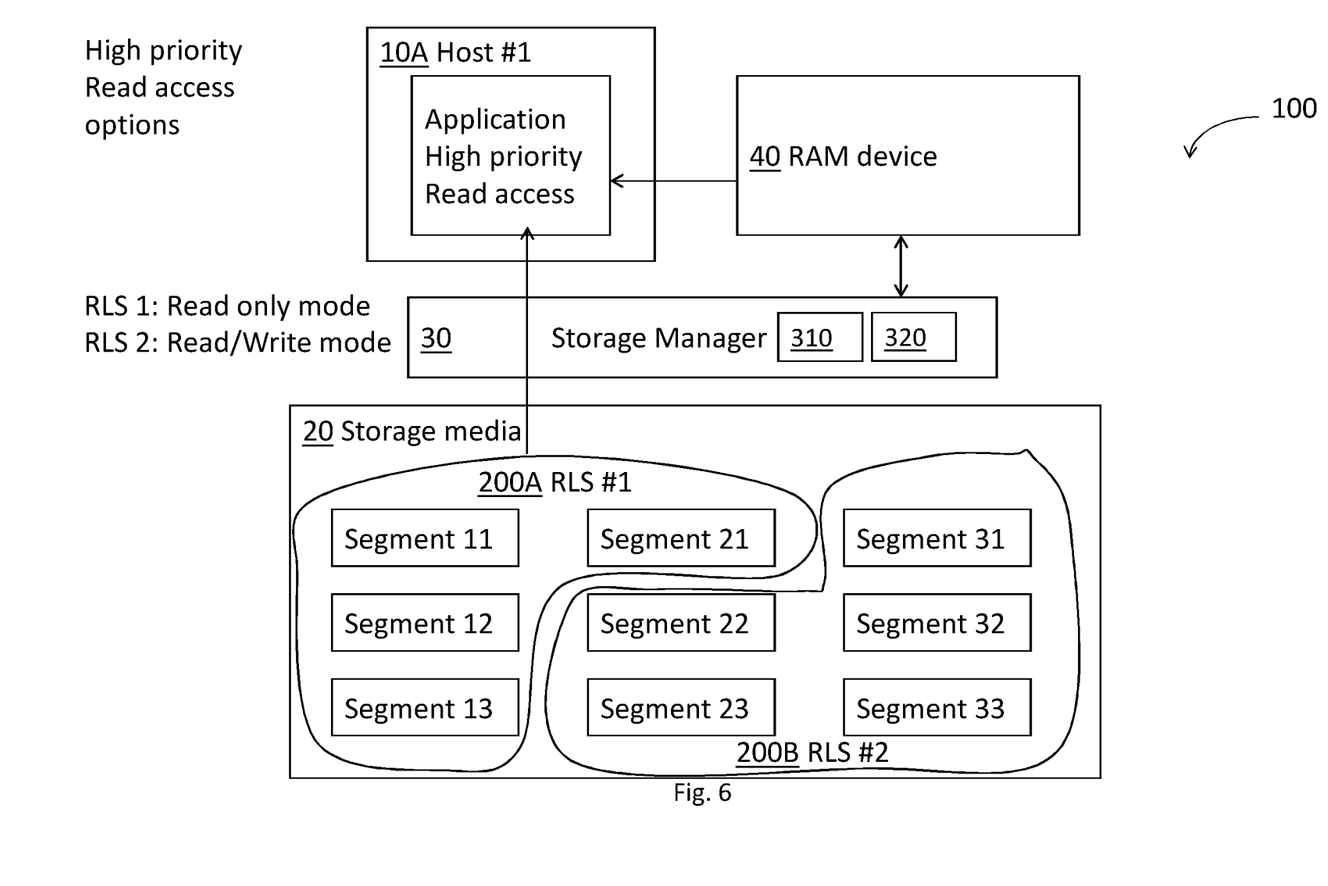
FIG. 6 is a block diagram, depicting two options of a high priority read access of a host computer to a storage device, according to some embodiments.

Reference is made to FIG. 6, which is a block diagram, depicting two options of a high priority read access of a host computer to the storage media 20, according to some embodiments. As illustrated by the arrows in FIG. 6, high priority read access requests may be serviced or served by storage manager 30 from either a segment referenced by or described within an RLS in a read-only work mode 200A (e.g. segment 11), or from RAM device 40.

Storage manager 30 may receive a high priority read access request from host computer 10A, concerning the high priority data. Upon receiving the high priority read access request, storage manager 30 may handle the request by reading the requested data from a memory segment that is in a read-only mode (e.g. segment 11).

Figure 7:
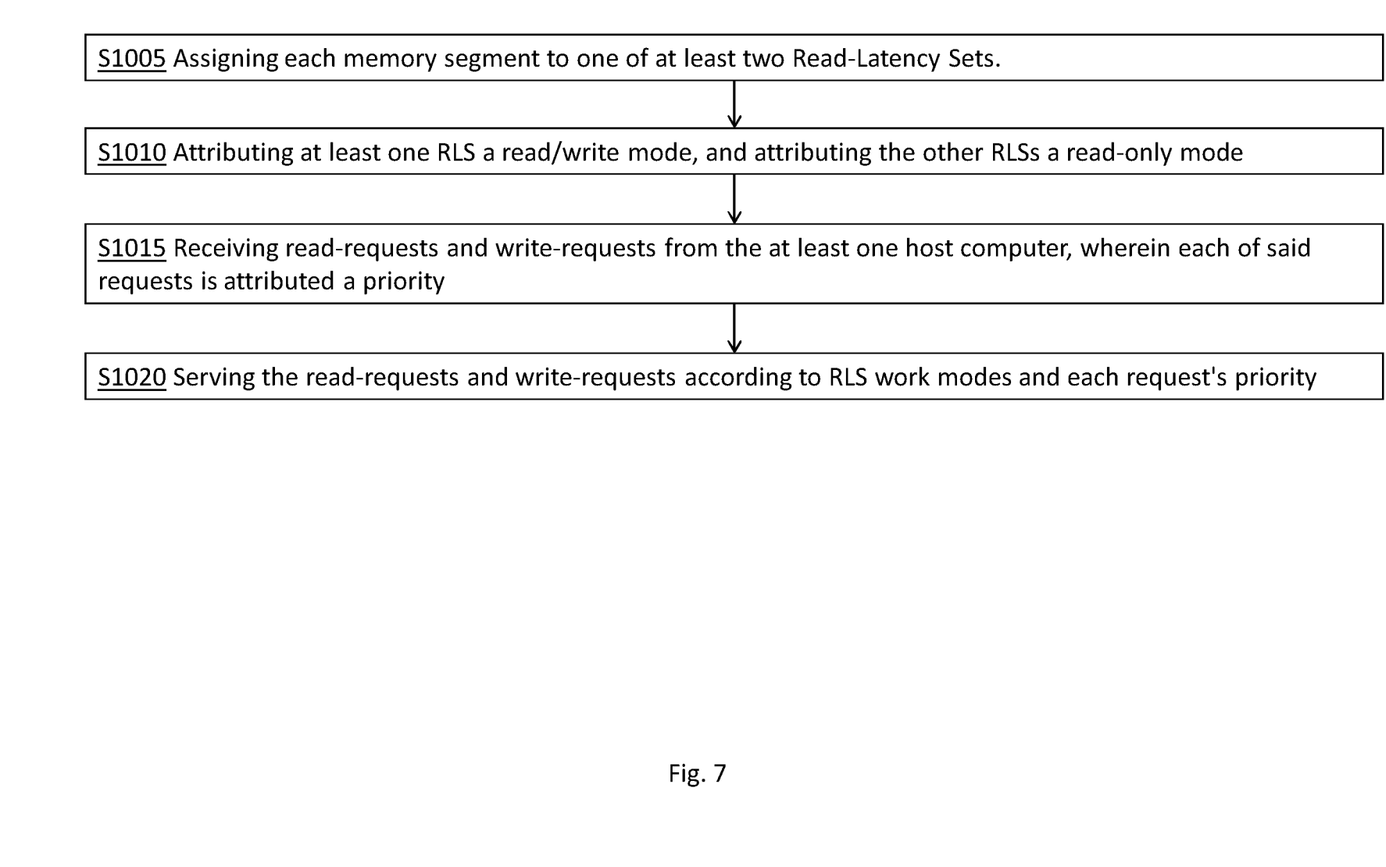
FIG. 7 is a block diagram, depicting a method for reducing read tail latency in memory and storage media, according to some embodiments.

Reference is made to FIG. 7, which is a block diagram depicting a method for reducing read tail latency in non-volatile memory devices, according to some embodiments.

As shown by block S1005, memory segments may be assigned to one of at least two RLSs.

As shown by block S1010, at least one RLS may be attributed a read/write mode, and the other RLSs may be attributed a read-only mode.

As shown by block S1015, read-requests and write-requests may be received from the at least one host computer. Each of the requests may be attributed a priority (e.g. a high priority and a low priority; other types of priority may be used).

As shown by block S1020, the read-requests and write-requests may be served or serviced according to RLS work modes and according to the priority of each request. As explained herein, storage of high-priority data is duplicated among RLSs, and thus read-access latency, and especially read-access tail latency of high priority data access requests may be minimized.

As explained above, in prior art systems the effect of read access blocking due to simultaneous write access requests to data storage systems affects the QOS and user experience greatly. Although the average latency of read access requests may only be mildly affected by read access blocking, tail latency may be influenced dramatically by this phenomenon.

As shown herein, in some embodiments division of the storage media (e.g., NVM storage media) space to different partitions, e.g. RLSs, in combination with (a) assigning or attributing to each RLS one of a read-only or read/write work mode and (b) duplication of only high priority data storage, may enable the storage media or storage device (e.g., NVM storage device) to serve or service without delay high-priority read access requests that arrive substantially at the same time as write access requests.

In some embodiments, this non-delayed service of read access requests may provide an improvement to the functionality of computer systems such as host computer 10A, 10B, that may be communicatively connected to online storage systems (e.g. cloud storage). In alternate embodiments, the non-delayed service of read access requests may improve local the utilization of storage systems (e.g. hard disk drives, Solid-State drives, Dynamic Random-Access Memory (DRAM) devices etc.) that may be installed locally, on a computing device (e.g. element 1 of FIG. 1).

According to some embodiments, storage manager 30 may receive at least one parameter (e.g. a speed parameter), associated with at least one characteristic of a storage device of storage media 20. Storage manager 30 may utilize the at least one parameter to select a specific target storage device for each data object, to balance a load between different storage devices according to each storage device's characteristics.

For example, assume that:

Storage media 20 includes a first SSD storage device and a second SSD storage device;

The first SSD device is faster (e.g. average read latency is smaller) than that of the second SSD by a factor of three (3);

Three data blocks (e.g. 'A', 'B', and 'C') are written to storage media 20,

Data block 'A' is of a high priority, and will hence be duplicated between the first SSD and the second SSD, as explained above; and Data blocks 'B' and 'C' are of normal priority and will hence not be duplicated. Storage manager 30 may consequently write data blocks A, B and C to the fast SSD, and only write data block A to the slow SSD, to balance the workload between the storage devices of storage media 20.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for reducing read latency of a storage media associated with at least one host computer, by at least one processor, the method comprising
    assigning each storage segment of the non-volatile storage to a first RLS and a second RLS, wherein the first RLS is attributed a read/write mode and the second RLS is attributed a read-only mode;
    upon receiving a high priority data-write request from the at least one host computer:
    writing the high priority data into a first storage segment referenced by a first RLS that is attributed a read/write work mode;
    writing the data into a RAM device simultaneously to writing the data into the storage segment referenced by the first RLS;
    switching the work mode of the first RLS from the read/write work mode to the read-only mode;
    switching the work mode of a second RLS from the read-only mode to the read/write work mode; and
    after the work modes of the first and second RLSs are switched, writing the high priority data into a second storage segment referenced by the second RLS by copying the high priority data from the RAM into the storage segment referenced by the second RLS.

2. The method of claim 1, further comprising cyclically alternating the attribution of the RLSs' work modes, to switch the modes between the read/write work mode and the read-only work mode.

3. The method of claim 1, further comprising:
    upon receiving a low priority data-write request from the at least one host computer, writing the data into a storage segment referenced by an RLS that is attributed a read/write work mode; and
    upon receiving a low priority data-read request from the at least one host computer, reading the data from the storage segment it was written to, regardless of the RLS's attributed work mode.

4. The method of claim 1, further comprising: upon receiving a high priority data-read request from the at least one host computer, reading the data from a storage segment referenced by an RLS that is attributed a read-only work mode.

5. The method of claim 1, further comprising: if the high priority data-write request is followed by a high priority data-read request for the same storage segment as for the high priority data write request, before the RLS's work mode has been alternated, then serving the high priority data-read request by reading the data from the RAM.

6. A system for reducing read latency in a storage media associated with at least one host computer, the system comprising:
    a plurality of storage segments comprised within at least one storage device; a Random-Access Memory (RAM) device and a processor, wherein the processor is configured to:
    assign each storage segment to one of a first Read Latency Set (RLS) and a second RLS, wherein the first RLS is attributed a read/write mode, and the second RLS is attributed a read-only mode;
    upon receiving a high priority data-write request of a data object from the at least one host computer, simultaneously write the high priority data into the RAM device and into a storage segment referenced by a first RLS that is attributed a read/write work mode;
    switch the work mode of the first RLS to the read-only mode;
    switch the work mode of a second RLS from the read-only mode to the read/write mode; and
    after the work modes of the first and second RLSs are switched, copy the high priority data from the RAM into the storage segment referenced by the second RLS.

7. The system of claim 6, wherein the processor is configured to cyclically alternate the attribution of each RLSs' work mode such that for each RLS the mode is switched between the read/write work mode and the read-only work mode.

8. The system of claim 6, wherein the processor is configured to:
    upon receiving a low priority data-write request of a data object from the at least one host computer, then write the data into a storage segment referenced by an RLS that is attributed a read/write work mode; and
    upon receiving a low priority data-read request from the at least one host computer, then read the data from the storage segment it was written to, regardless of the RLS's attributed work mode.

9. The system of claim 6, wherein the processor is further configured to: upon receiving a high priority data-read request from the at least one host computer, read the data from a storage segment referenced by an RLS that is attributed a read-only work mode.

10. The system of claim 6, wherein the processor is further configured to:
    if the high priority data-write request is followed by a high priority data-read request for the same storage segment as for the high priority data write request, before the RLS's work mode has been switched, then serving the high priority data-read request by reading the data from the RAM.

11. The system of claim 6, further comprising a metadata table, configured to associate a virtual address of at least one stored data object to a plurality of physical addresses, where the data object is duplicated across different RLSs.

12. The system of claim 11, wherein the processor is further configured to manage an overwrite of a high-priority, duplicated data object by:
rewriting the data object in a duplicated plurality of locations on different RLSs;
invalidating the previous duplicated instantiations of the data object; and
updating the metadata table according to the changed physical storage addresses of the high-priority data object.

13. The system of claim 12, wherein the processor is further configured to perform garbage collection (GC) on a data object that is duplicated on a first storage segment and a second storage segment by:
copying a first duplication of the data object from the first valid storage segment to second third storage segment, wherein the third storage segment is in an RLS different from the second storage segment;
invalidating the first duplication of the data object on the first storage segment; and
updating the metadata table to reflect the corresponding change in the physical address of the first duplication of the data object.

14. The system of claim 6, wherein the processor is further configured to receive at least one parameter, associated with a characteristic of at least one storage device and select a specific target storage device for each data object, to balance a load between different storage devices according to each storage device's characteristics.

15. A method for managing, by a processor, high priority data access requests of at least one host computer to a storage device, method comprising:
receiving a high priority write access request from the at least one host computer:
simultaneously writing data of the high priority write access to a first segment of the storage device and to a RAM device, wherein the first segment is attributed a read/write working mode;
switching the work mode of the first segment from read/write working mode to a read-only working mode;
switching a work mode of a second storage segment of the storage device from a read-only work mode to a read/write work mode: and
copying data of the high priority write access from the RAM device to the second segment of the storage device after both the work mode of the first segment and the work mode of the second segment are switched.

16. The method of claim 15, further comprising periodically alternating the work modes of the first segment and the second segment to switch between the read/write work mode and the read-only work mode.

17. The method of claim 16, further comprising receiving a high priority read access request from the at least one host computer; and reading the requested data from a storage segment that is in a read-only mode.

\* \* \* \* \*